United States Patent [19]
Shepherd

[11] Patent Number: 4,733,833
[45] Date of Patent: Mar. 29, 1988

[54] VEHICLE DOCKING SYSTEM

[76] Inventor: Gordon J. Shepherd, Lindacre House, Hall Lane, Mobberley, Cheshire, England

[21] Appl. No.: 640,343

[22] Filed: Aug. 13, 1984
(Under 37 CFR 1.47)

[30] Foreign Application Priority Data

Aug. 17, 1983 [GB] United Kingdom ............... 8322176

[51] Int. Cl.⁴ ............................................. B64F 1/18
[52] U.S. Cl. .............................. 244/114 R; 364/463; 340/958; 180/168
[58] Field of Search ................... 244/114 R; 340/935, 340/947, 958, 700, 953, 956, 987; 180/168; 116/202, 212; 364/463

[56] References Cited

U.S. PATENT DOCUMENTS

| | | | |
|---|---|---|---|
| 2,735,291 | 2/1956 | Quinn | 364/463 |
| 3,132,710 | 5/1964 | Petrella et al. | 340/958 |
| 3,474,406 | 10/1969 | Gilstrap | 340/953 |
| 3,593,263 | 7/1971 | Olsen | 340/935 |
| 3,775,742 | 11/1973 | Zechnowitz et al. | 244/114 R |
| 4,158,885 | 6/1979 | Neuberger | 340/953 |
| 4,184,655 | 1/1980 | Anderberg | 244/114 R |
| 4,414,532 | 11/1983 | Kaul | 244/114 R |

*Primary Examiner*—Galen Barefoot

[57] ABSTRACT

An aircraft docking system comprises a plurality of pairs of load sensors embedded in the surface of the airport apron. A visual display comprises three parallel columns of chevrons each comprising a plurality of fibre optics which transmit light from a source to the surface of the display and a stop sign. An aircraft approaching along the correct path will cause the chevrons of the central column to be sequentially illuminated. Divergence from that path will cause a chevron on the appropriate outer column to be illuminated. When the aircraft reaches the correct docking point, the stop sign is illuminated.

11 Claims, 3 Drawing Figures

VEHICLE DOCKING SYSTEM

The present invention relates to a vehicle docking system particularly, but not exclusively, for the use of aircraft.

At the present time after an aircraft has landed on the airport runway it proceeds to a selected docking or parking position to discharge its passengers and/or cargo. Large modern aircraft are difficult to manoeuvre accurately on the ground and the aircraft pilot is therefore provided with assistance from the ground. Such assistance may be wholly manual or involve installations at the docking point which the aircraft captain may utilize.

In the manual method, which is naturally manpower intensive, an operative on the ground gives manoeuvring and stop directions to the captain of the aircraft. These directions are communicated to the captain by arm signals using special batons which may be illuminated at night-time. If the aircraft requires guidance over relatively long distances, special vehicles equipped with "follow me" signs or the like may be provided. Advantages of this method are that the operative can dock the aircraft at any chosen position on the airfield and no complex equipment is required. Disadvantages are that it is a very expensive method, particularly at airports which operate during anti-social hours. It is not a very accurate method of docking an aircraft and is almost an impossible method if the aircraft is to use a Nose-loader or Airbridge. It is not a satisfactory method during low weather minima operations. It is not the most safe method, particularaly when a vehicle is involved, although the operative on the ground is now less vulnerable now that propeller-type aircraft are not so prevalent in operation.

In a first method involving installation of equipment two sets of lighting systems known as Papi (Paralax Approach Path Indicators) and Agnis (Azimuth Guidance Nose-In Systems) are employed. The Papi display is usually mounted to the right of the aircraft on docking approach and comprises a blackboard with a horizontal slot in it, behind which is a verticl fluorescent lighting-tube. On the face of the blackboard is painted vertical lines which correspond to the aircraft likely to use the particular docking area. The board markings are so calibrated that the captain sitting in the left-hand seat of the aircraft will, when the vertical fluorescent light is in line with the white-markings on the front side of the blackboard, stop his aircraft in what should be the correct docking position in the longitudinal plane, that is the plane in which the longitudinal axis of the aircraft lies. Agnis provides centre-line information. The system comprises a box housing two vertical lines of light which is normally mounted on the face of the building immediately on the extended centre-line of the aircraft's path. The lights pass through coloured filters so that when the aircraft is on the correct centre-line, the captain will see two green vertical lines of light. Should he deviate to the left, the left-hand beam of light will become red, indicating that a right manoeuvre is required until two green lights are again seen. Should he deviate to the right, the right-hand beam of light will turn red, indicating that a left manoeuvre is required until two green lights are again seen. The Papi and Agnis configuration has been in use for many years and like method one, now fails to fulfil the purpose of accurate aircraft docking due to its incompatibility with other systems following modernization.

Advantages of this system are that it negates the use of manpower and therefore is cheaper than the manual method to operate. Equipment is not very complex and only moderate capital costs are therefore involved.

Disadvantages are that siting is critical, involving two structures for the system and, therefore, the captain has to observe two pieces of equipment which, in the final docking stages is further apart than the aircraft is from the equipment. It relies for stopping distance, purely on paralax and, therefore, is only acceptable when viewed from a predetermined, usually the left-hand, seat of the aircraft. It is not very accurate and when used in conjunction with nose-loaders or air-bridges, wide azimuth adjustment of this equipment is necessary to adjust for inaccuracies in the aircraft stopping distance. From the aximuth point of view, the best accuracy is plus or minus 350 mm about the centreline. It is not ideal for low weather minima. Although the azimuth information is a little bit better than the Papi board, although it is pretty useless for category two and three operations, e.g., for the last twenty metres when foggy. It is not the most energy efficient system, since it is usually operational from the time the aircraft lands to final taxi-ing and positioning. Until it is switched off manually, the consumption is approximately 2 Kw.

In a second method involving installation of equipment, the captain negotiates his aircraft along a designated centreline and makes his final turn for a "straight-in" docking manoeuvre. Disposed straight ahead of the aircraft in view of the aircraft captain is a vertical panel approximately 1.8 m high by 0.85 m wide. The panel incorporates means, activated by a manual input, for indicating the type of aircraft about to dock. This display is at the top of the board. The panel also includes two vertical columns of yellow sequencing lights at the extreme left and right of the panel. As the aircraft nose-wheel passes over a series of inductive loops laid just below the concrete surface which correspond to successful rows of lights, the appropriate pair of lights are illuminated, in sequence as the aircraft closes nearer to the docking point. When the aircraft reaches the stopping-point two red lights flash at the top and the word "Stop" is illuminated in red on the panel.

In this arrangement the azimuth reference is provided again by the use of paralax. Between the two vertical columns of lights is the image of an aircraft with a very pronounced slim fuselage and projecting forward approximately 0.7 meter from the main panel is a vertical bar just over a metre in height. When the captain is on centre-line the vertical bar will appear to him in line with the image of the aircraft's fusealage. If the aircraft is to the left, the aircraft's image appears to be on the left-hand side of the bar. Likewise, if the aircraft is on the right, the reverse applies. In order to attempt to maintain a feasible compatibility, the image of the aircraft and vertical bar are both illuminated and the intensity of the whole system is adjusted relative to the ambient light by means of photo-electric cells. Additionally, there are two green lights at the bottom of the display board which, when illuminated, clears the aircraft to enter into the stand position.

This system incorporates a central unit and a scanning unit, both microprocessor based. The former incorporates a soft-ware package which will indicate the aircraft-type, and its exact stopping position relative to the manual input. The operator, having inserted the appropriate aircraft-type, is then recommended to check the display board that the correct aircraft has been selected, the azimuth centre-line and corresponding aeroplane configuration are lit, the green lights are lit and the appropriate yellow lights are lit. The operator is expected to be in attendance throughout the docking period and, in an emergency, controls are provided which may be operated if any vehicle encroaches within the safe area in front of the aircraft about to dock, in which case the Stop signal is displayed to the approaching aircraft. The whole system is turned off 20 seconds after the aircraft has reached the stop position.

This method of docking an aircraft has a number of advantages over the method previously described. It isfairly accurate and the response time is very quick. It is usable during the lower limits of weather operations although it becomes difficult under category three conditions. There is only one display for the captain to observe, the azimuth and stopping distance indicators being co-sited. Energy consumption is relatively low.

However, it is disadvantageous in that it still relies on paralax for azimuth information and is only usable from a predetermined, usually the left-hand, aircraft seat. Even then, the accuracy is not as specific as it could be and azimuth adjustement of the airbridges or noseloaders is still necessary. It still requires manual input which necessitates operators being available during the docking manoeuvres. Under the lower visibilities the azimuth reference tends to be at its weakest and because of the short distance the information is displayed, it makes it more difficult for the larger-type aircraft to centralize itself. Although the system is quite complex no provision is made to integrate with the proceeding aircraft manoeuvres nor interlocking and interfacing with bridges and other post aircraft landing operations.

According to the present invention, there is provided, a vehicle docking system comprising means responsive to the load imposed by the vehicle disposed along a path to be followed by the vehicle to the docking point, and means for receiving signals from the means response to the load and for passing vehicle directional information to the vehicle operator in dependance upon the load sensed.

In a preferred embodiment of the invention for use with an aircraft, the means responsive to the load comprises a plurality of pairs of load sensors disposed at spaced intervals along the path the vehicle should follow to the docking point. The load sensors of each pair are disposed on opposite sides respectively of the centre line of the path. Each sensor is adapted to supply a plurality of signals, for example five, to afford accurate information of the position of the nosewheel of the aircraft in relation to the centre line on the docking path. For this purpose, each sensor may comprise a corresponding plurality of load cells.

The sensors are advantageously elongate in form. With the exception of those sensors disposed at the final docked position of the aircraft nosewheel, the longitudinal axis of each sensor will be substantially at right angles to the centre line of the docking path, since at those positions it is the information regarding the transverse displacement of the nosewheel from the centre line which is most important. Those sensors at the final nosewheel docked position may need to be longer than those at the other spaced position to provide for the different nosewheel docked position of the various type of aircraft which are to use the system. Alternatively, two or more sensors disposed end to end may be employed on both sides of the centre to provide the required longitudinal coverage.

The means for passing information to the vehicle operator, in this case the aircraft captain, preferably comprises a visual display. This may be mounted on the airport buildings or on a separate support at cockpit level ahead of the aircraft docking point. The display may comprise three columns of chevron shaped lights with a line which runs through the apices of the chevrons of the centre column to represent the centre line of the docking path. The figures of an alpha-numeric display above those columns may indicate the stand number and a stop instruction. Each chevron comprises a plurality of individual fibre optics for the transmission of light from a light source to the surface of the display. The rows of chevrons respectively correspond to respective pairs of load sensors apart from the first pair of load sensors and indicate by appropriate use of colour whether the nosewheel and therefore the aircraft is veering to the right or to the left of the centreline. For example, if the nosewheel is veering too far to the left, of the centreline, the fibre optics for the appropriate chevron of the left-hand column will be connected to a source of red light. If the nosewheel veers too far to the right, the appropriate chevron of the right-hand column will show red. If the nosewheel is on, or within acceptable limits of, the centre line then the appropriate centre chevron will show white. A comparison of the signals from the first pair of sensors with those from the second pair can be employed to indicate the direction of movement of an aircraft and therefore whether it is docking. On confirmation of docking, information regarding the type of the aircraft docking will be fed to a central control so that a stop signal is generated on the display when the nosewheel reaches the docking position at the end of sequential illumination of rows of chevrons. This central control can be employed not only to calculate the length of docked time at an appropriate stand of an identified aircraft, but also to generate an appropriate invoice for that. Furthermore, the sensitivity of the load sensing system is such that the loading and unloading of the aircraft can be monitored if desired.

In order that the invention may be more fully understood, one embodiment thereof will now be described, by way of example, with reference to the accompanying drawings, in which.

Figure 1:
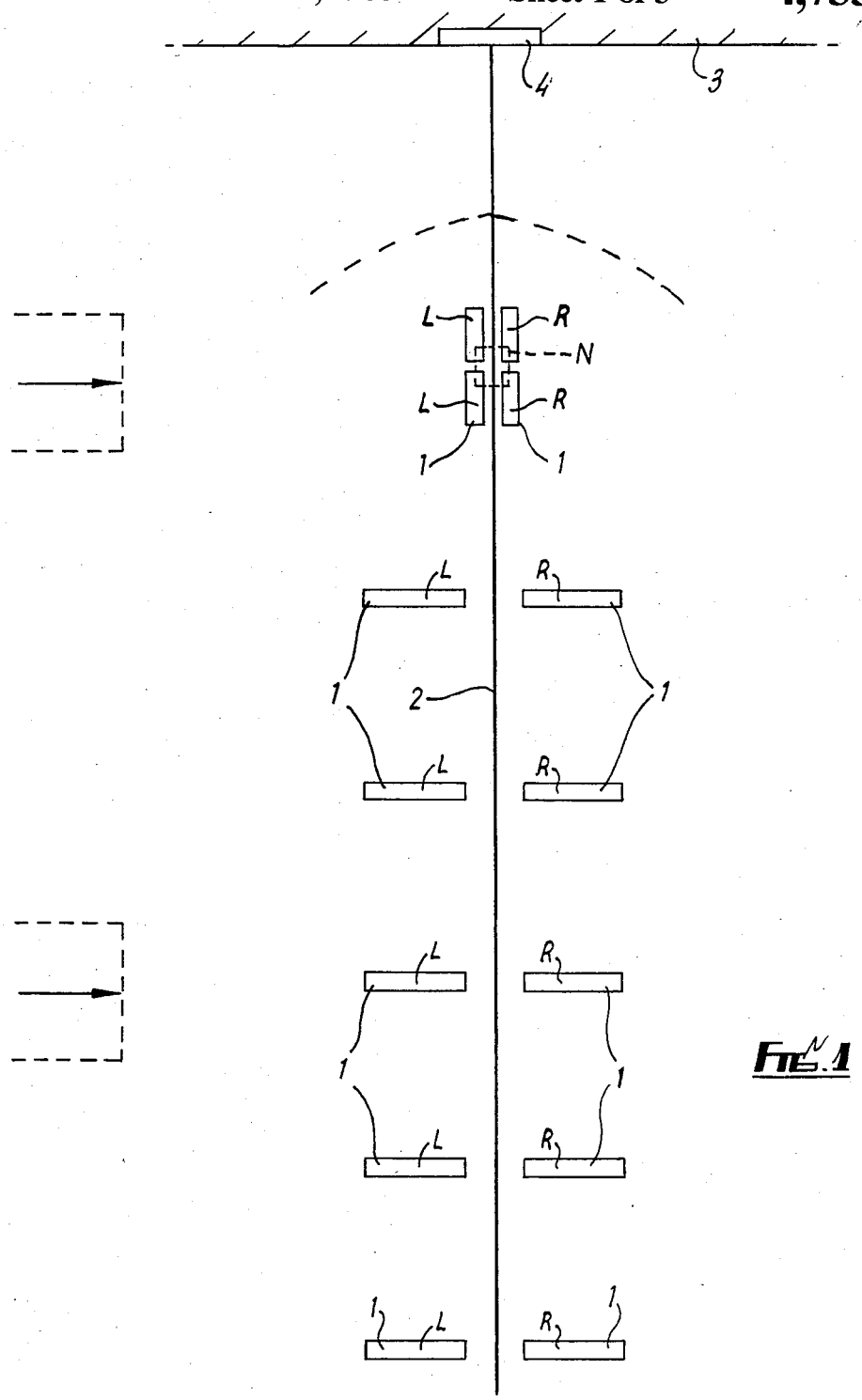
FIG. 1 shows a diagrammatic view of an airport aircraft docking position.

Referring to FIG. 1, the principle behind the system is to determine the position of an aircraft by sensing its weight. To this end, a plurality of pairs of load sensors 1 are embedded in the tarmac of the apron on the path that the aircraft is to follow to its final docking point. Respective sensors of each pair are disposed on opposite sides respectively of the centre line 2 of that path. In FIG. 1 the left hand sensors of each pair are referenced L and the right hand sensors are referenced R. Each sensor is elongate and the majority have their longitudinal axes disposed at right hand angles to the centre line 2. The number and spacing of the sensors may be chosen as desired. To provide for accurate location of the aircraft nosewheel (shown in dotted outline in FIG. 1) at the final docking point for the whole range of aircraft sizes which might be expected to use the system, those sensors closest in to the stand are disposed parallel to the centreline. To promote standardisation whilst providing sensors along the desired length of the centreline, two sensors are disposed end to end on both sides of the centre line 2.

Figure 2:
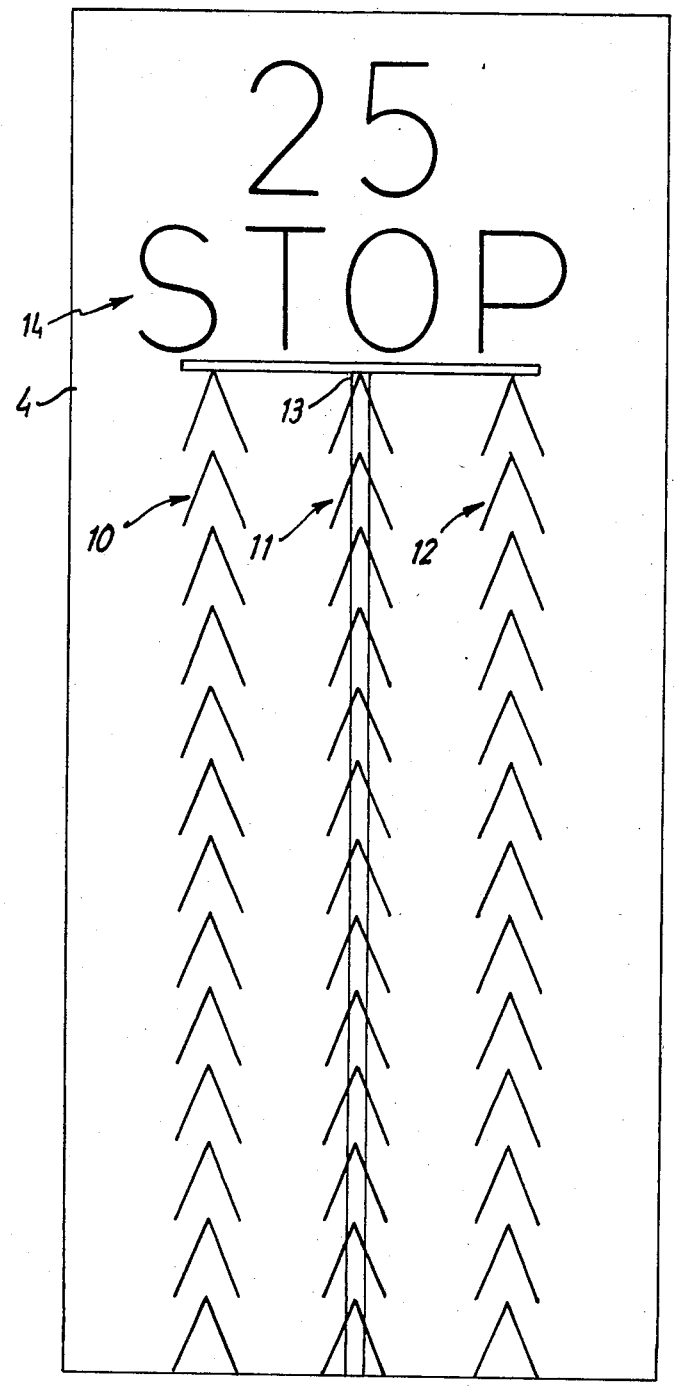
FIG. 2 shows a display panel forming part of an aircraft docking system for use at the docking position of FIG. 1.

A visual display 4 is fixed to the aircraft building 3 ahead of the centreline 2 and at the approximate average cockpit height above the apron. This display is shown in more detail in FIG. 2. It comprises three columns 10, 11 and 12 of chevrons each made up of the ends of a plurality of fibre optics. These chevrons are also arranged in rows and the rows correspond respectively to the pairs of load sensors arranged at right angles to the centre line 2. The centre line 2 is represented on the display 4 by a line 13 extending through the apices of the central column of chevrons. Above the three columns is an alphanumeric display 14 comprising the letters of the word stop and number representing the stand in question. The display advantageously has a matt black surface is of the order of 0.7 m wide by 1.8 m high and is disposed about 8 metres from the docked position of the aircraft nose.

An aircraft normally follows a route from the runway to the stand delineated by a yellow line and green centreway taxiway lights. During the last 50 metres of its manoeuvre, the nosewheel of the aircraft will intercept the first of the series of twin sensors 1. For a conventional stand, there are thirteen pairs of such sensors 1 laid at ninety degrees to the extended centreline and positioned just forward of the taxiway centreline light where they exist. Where there are no centreline lights, the sensors are placed at convenient positions within the surface of the apron and, normally, equally spaced along the fifty meters. The distance between each pair of sensors is half the distance between the outer edges of the nosewheel of the smallest aircraft likely to use the designated stand. The length of each sensor is designed to meet the most complex manoeuvre but normally and for standardisation each sensor is 0.9 m long. Signal detector and solid state circuitry associated with each sensor is housed, all self-contained within each sensor box. Each box is of sufficient strength to carry the maximum load to which it is likely to be subjected by the nosewheel of a rotating load when the corresponding aircraft is under a breaking condition. The maximum dimensions of each sensor are 100 mm wide and 75 mm deep,. The top of the sensors box is flush with the surface of the apron and the sensor itself is domed to have a maximum projection at its peak of not more than 15 mm well within the prescribed ICAO prescribed limits.

For normal docking stands, thirteen pairs of perpendicularly disposed sensors 1 are employed. The last pair of sensors installed parallel to the centre-line 2 are of the order of 75 mm either side of the centre line. For stands which are fully universal packets to accept any type of aircraft, the final sensors will need to be of extra length; in order to maintain standardisation as previously described two pairs of sensors will be employed end-to-end to accommodate the aircraft's nosewheel centreline to centreline of loading door will accommodate variations in the order of 2.62 m. Each pair of sensors, for the purpose of functional operation, reads as one unit and produces five distinct outputs relative to the nosewheel position about the centreline indicating as follows:

(i) Well left of centreline (between 0.6 and 1 m of track)

(ii) Nearing centreline (between approximately 0.2–0.6m)
(iii) Extreme right of centreline tolerances as for (i)
(iv) Slightly right of track (tolerances as for (ii)
(v) Will give centreline information derived from comparative signals from a combination of functions i-ii and iii-iv Providing that the aircraft proceeds accurately down the centreline 2, the chevron of the central column 13 will be progressively and successively illuminated with white light. If the aircraft veers to the left, the appropriate chevron of the left-hand column 11 will be illuminated with red light. If the aircraft veers to the right, the appropriate chevron of the right-hand column 12 will be illuminated with red light. The aircraft captain will take corrective action in either of these two cases to extinguish the red chevrons.

The received sensor signals are analysed and directed three ways:
(i) As a positioned signal onto the display board 4 visible to the aircraft captain,
(ii) As a historic signal terminating the previous aircraft manoeuvre,
(iii) A signal to alert the second sensor.

Signals two and three will be common irrespective of the nosewheel position. Sensor number two will be alerted from sensor one to anticipate that a signal will shortly be generated from the nosewheel of an aircraft. When this second signal is initiated, the signal from the first sensor to the display board 4 will be cancelled, the direction of the aircraft will be identified and the position of the nosewheel at this second sensor will be sent to the display board 4. A signal from sensor two will be passed on to sensor three irrespective of the position of the nosewheel N on sensor two. The process will be repeated up until sensor number twelve by which time the captain should have steered his aircraft onto the centreline 2 as indicated on the display board 4 with an accuracy achievable of ±50mm.

Figure 3:
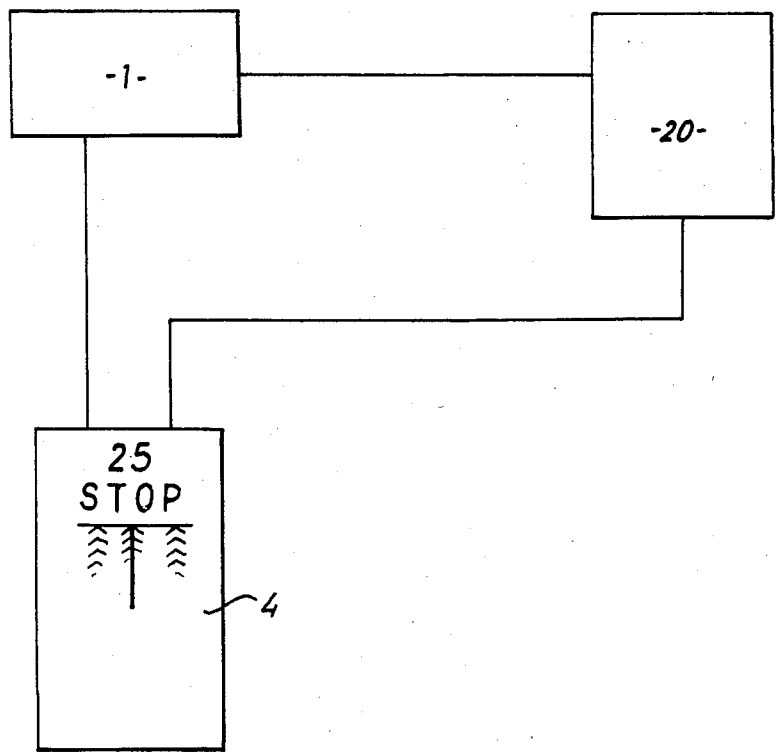
FIG. 3 shows a block circuit diagram of a docking system incorporating the panel of FIG. 2.

By the time the nosewheel reaches sensor number thirteen, the system will have received advice of the type of aircraft currently docking from a central control point 20 (see FIG. 3). This will determine exactly where the nosewheel N will generate the final signal to illuminate the stop sign of the display and instruct the aircraft to stop.

After a drill period, adjustable from ten to thirty seconds, the docking system will be extinguished. Its memory, however, will retain the nosewheel load of the final sensor, indicating to other functions that that stand is committed. The signal will be divided and distributed to other systems yet to be "worked up".

When an aircraft is on pushback and has sensed an offloading and onloading, a signal from sensor thirteen will be passed to twelve and so on, by which time the sensors will have detected direction. If, by the time a signal is received from sensor number two, the direction will have been confirmed and a final output will be available to initiate a routine pattern.

The above described system enables commerical aircraft of virtually any tpye to be accurately docked, thus facilitating the positioning of passenger disembarkation equipment. It permits information to be provided from which invoices relating to stand occupation can be generated. The sensitivity of the load sensors is such that passenger or cargo loading can be sensed and an alert thereby automatically generated of imminent aircraft departure. The avoidance of the use of parallax eliminates parallax based errors inherent in parallax based systems.

It will be appreciated that the above embodiment has been described by way of example only and that many variations are possible without departing from the scope of the invention.

Digital interlocking may be employed so that it will only be possible to have one chevron illuminated at any one time and the chevrons will be illuminated in an upwards direction as the aircraft moves forward towards its docking position.

To improve discrimination and to minimise equipment costs, when the aircraft is on the extreme left of the centreline, the left hand chevron may be red. As the aircraft closes from left to centreline two chevrons lineable may be illuminated, the left hand red and the centreline white. As the aircraft is to the right of centreline a similar sort of display, but handed, will be available.

When the aircraft reaches the stopping position, a stop display will be illuminated. If the captain has failed to manoeuvre his aircraft exactly on to the centreline, the appropriate chevron or chevrons will be displayed, indicating well left, near centreline, well right, or near centreline from the right. Under normal accurate docking parameters, the aircraft nosewheel will be exactly on the centreline and therefore the white top chevron will be illuminated along with the stop sign.

If during the docking procedure, an obstacle appears in front of the aircraft and within the sensor's sensitivity, the indicator may advise the captain to stop. If the object moves "out of the way", the stop illumination will be extinguished.

The use of fibre-optic cables minimises operational costs and enables the display to be visible during category III all-weather operation.

The display may be extinguished after a variable time display to suit the client's requirements, but usually not greater than 30 seconds after the aircraft has come to rest. The stand number may be illuminated separately at the wish of the client.

As described, the stand number is incorporated in the docking display. This may be illuminated along with a red stop-bar and vertical green light as soon as that stand has been selected and providing the final sensor is not indicating "stand occupied", the information of which will be in store following a sequence of events as the aircraft docked initially, thus preventing an obstruction which may be standing on the final sensor, inhibiting its use.

Light sensors may be incorporated into the system so that any display to the approaching aircraft will be visibly compatible with the ambient light. Visors may be provided on display boards which are subject to direct sunlight.

What I claim is:

1. A vehicle docking system comprising load responsive means disposed along the path of travel on the ground followed by a vehicle to a docking point; a visual display coupled to and receiving signals from the load responsive means providing vehicle position information to the vehicle operator dependant upon the load sensed by said load responsive means, the visual display comprising a plurality of columns of indicators, one indicating the desired path of the vehicle and two other indicator columns one on each side of said one column which when actuated indicate divergence of the vehicle to a side of the desired vehicle path, said indicators that indicate divergence being connected to an responding to load responsive means off the desired path of travel of the vehicle.

2. A vehicle docking system as claimed in claim 1, in which the means responsive to the load comprising a plurality of load sensors disposed at spaced intervals along the path the vehicle should follow to the docking point.

3. A vehicle docking system as claimed in claim 2, in which the means responsive to the load comprises a plurality of pairs of load sensors disposed at spaced intervals along the path of the vehicle, with the sensors of each pair being disposed on opposite sides respectively of the centre line of the path.

4. A vehicle docking system as claimed in claim 2, in which each sensor is adapted to supply a plurality of signals to indicate the position of the vehicle in relation thereto.

5. A vehicle docking system as claimed in claim 2, in which each sensor comprises at least one load cells.

6. A vehicle docking system as claimed in claim 2, in which each sensor is elongate in form.

7. A vehicle docking system as claimed in claim 2, in which the majority of the sensors are disposed transverse to the direction of travel of the vehicle to be docked.

8. A vehicle docking system as claimed in claim 1, in which each indicator comprises at least one fibre optics for the transmission of light from a source to the display.

9. A vehicle docking system as claimed in claim 1, in which the indicators are colour coded.

10. A vehicle docking system as claimed in claim 1, in which the visual display comprises a stop indicator arranged to be activated by a selected one of the sensors.

11. A vehicle docking system as claimed in claim 1, in which means are provided for monitoring the signals from the means responsive to the load in order to indicate loading and unloading of the vehicle.

* * * * *